United States Patent [19]
Merino Lopez

[11] Patent Number: 6,143,223
[45] Date of Patent: Nov. 7, 2000

[54] PROCESS AND MOLDING ELEMENT FOR MOLDING A GROOVE IN A TIRE TREAD

[75] Inventor: Jose Merino Lopez, Riom, France

[73] Assignee: Compagnie Générale des Etablissements Michelin - Michelin & Cie, Clermont-Ferrand Cedex, France

[21] Appl. No.: 09/216,225

[22] Filed: Dec. 18, 1998

[30] Foreign Application Priority Data

Dec. 24, 1997 [FR] France ................................. 97 16649

[51] Int. Cl.$^7$ ........................... B29C 35/00; B29C 39/36
[52] U.S. Cl. ........................ 264/219; 249/142; 264/319; 264/326; 425/46; 425/195
[58] Field of Search ................................ 264/326, 325, 264/319, 315, 320, 219; 425/46, 195, 32, 441; 249/56, 131, 142

[56] References Cited

U.S. PATENT DOCUMENTS

| | | | |
|---|---|---|---|
| 1,223,726 | 4/1917 | Overman | 425/46 |
| 1,733,064 | 10/1929 | Lambert | |
| 2,661,041 | 12/1953 | Walsh | |
| 4,921,673 | 5/1990 | Holroyd et al. | 264/326 |
| 4,992,035 | 2/1991 | Holroyd et al. | 425/195 |
| 5,022,448 | 6/1991 | Ochiai | 152/209 R |
| 5,340,294 | 8/1994 | Kata | 425/46 |
| 5,980,810 | 11/1999 | Ladouce | 264/326 |

FOREIGN PATENT DOCUMENTS

| | | |
|---|---|---|
| 0342908 | 11/1989 | European Pat. Off. |
| 2 759 321 | 8/1998 | France |
| 2 759 323 | 8/1998 | France |
| 4130143 | 3/1993 | Germany |

Primary Examiner—Mathieu D. Vargot
Attorney, Agent, or Firm—Baker Botts L.L.P.

[57] ABSTRACT

A process of molding of a rubber tread making it possible, after molding the grooves, to strip the mold without rupture of connecting elements molded in the grooves. A molding element for molding a groove pattern in a rubber tread, the groove defined by at least two main opposite walls joined by at least one molded rubber connecting element, the molding element being designed to project from a molding surface of the mold and presenting at least one opening for molding a connecting element during molding of the tread. The molding element is constituted by the assembly of a first part forming a support, intended to be fastened to a piece of a mold by appropriate means, and of a second part constituted by at least one piece forming a key. Each key is disengaged from the support in order to strip the molding element from the mold.

19 Claims, 5 Drawing Sheets

PROCESS AND MOLDING ELEMENT FOR MOLDING A GROOVE IN A TIRE TREAD

BACKGROUND OF THE INVENTION

The invention relates to a process for molding a groove pattern in a rubber tread, the walls of which are joined by at least one rubber connecting element, as well as a molding element equipping a mold for fabricating new or renovated tire treads, in order to use such a process. The invention also concerns tire treads made according to that process.

The term "groove" is understood to mean any recess made in a rubber tread and defined by at least two main rubber walls facing each other, said walls being separated by an average distance representing the width of the groove, the intersection of each of said walls with the rolling surface forming a rubber edge.

"Connecting element" is understood to mean a rubber part forming, when new, a bridge permanently joining the main walls of a groove, so as to maintain sufficient rigidity on the tread provided with said groove.

The published French patent application FR 2,759,323, describes a sculpture of a tire tread containing a plurality of grooves having at least one connecting element mechanically joining two main walls. In that way, it is possible to have a large number of grooves on the entire tread and, consequently, a large number of rubber edges ensuring good performance on a wet road, without that resulting in too great a reduction of stiffness of the tread.

In said patent application, a process is also described for making such a groove, according to which an insert is placed in the unvulcanized rubber tread, provided with one or more openings intended to let the rubber through during the molding and vulcanization of said tread, in order to form the connecting element or elements. Said insert is made of a material capable of withstanding molding stresses and further having the property of being progressively eliminated during rolling of the tire. In the present case, the groove thus formed is almost totally filled with the insert, which reduces its drainage and reservoir capacity accordingly on rolling over a wet road.

It is, of course, possible to remove the insert partially or totally after molding and vulcanization of said tread, but that then adds an operation to the production cycle.

In a second published French patent application FR 2,759,321, another process is proposed for obtaining a tire tread provided with a sculpture containing grooves having at least one connecting element. Said process consists of using a mold formed by two parts, the first part molding the outer surface of the tread corresponding to its rolling surface and the second part molding the inner surface of said tread, both of said parts defining in molding position a volume corresponding to that of said tread. In addition, each part of the mold is provided with at least one molding element projecting on its molding surface and intended to come partially in contact with a molding element borne by the other mold part, in order to mold a groove totally crossing the tread in its thickness. The partial contact between the molding elements in contact forms at least one opening for molding at least one rubber bridge mechanically joining the walls of the groove thus molded.

This second process, making possible easy stripping of the tread after molding and vulcanization, requires the connecting elements, however, to be situated in zones of contact between the molding elements of the first part of the mold and the molding elements of the second part.

Figure 1:
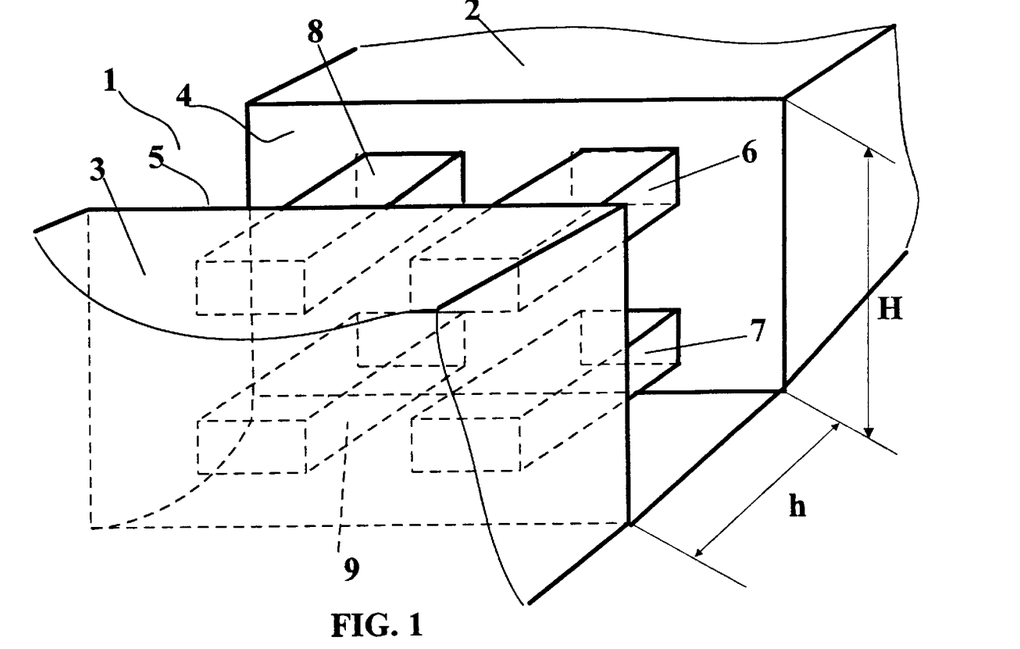
FIG. 1 shows a slit in a tire tread, said slit containing four connecting elements.

FIG. 1, partially showing two rubber blocks 2 and 3 separated by a slit 1 (that is, a narrow groove) and joined by four connecting elements 6, 7, 8, 9, illustrates one particular example of the arrangement of said connecting elements which it is not possible to carry out according to the process described in the French patent application published under number FR 2,759,321 for the simple reason that the elements are situated in pairs above each other in the direction of thickness of the tread, that is, generally perpendicular to the rolling surface of said tread. Furthermore, this process does not make possible the direct production of a tire provided with a tread, but systematically requires an additional stage in the manufacture of a tire. In fact, after fabrication of a tread in a mold in two parts, it is then necessary to add and glue said premolded tread on a tire blank before molding and final vulcanization of said tire in the case of manufacture of a new tire.

All of the other known processes employing a molding element (in particular, in the form of a thin strip) do not make possible the formation of a groove having at least one connecting element whose intersections with the walls of said grooves present contours, all points of which are situated at a distance strictly greater than zero in relation to the bottom of the slit, so that the continuity of volume of the groove is preserved. In fact, every connecting element formed during molding and presenting such characteristics is broken during stripping, the molding element splitting said rubber bridge during that phase.

SUMMARY OF THE INVENTION

The object of the present invention is to propose a process of molding employing a new molding element intended to make a groove in a rubber tread, provided with at least one rubber connecting element joining two of the main walls of said groove, said process not presenting the problems of the processes previously described. A molding element according to the invention makes it possible, for example, to form a groove provided with connecting elements arranged as shown in FIG. 1.

The process of the invention consists of using a mold forming a tread, said mold containing several mold pieces, each mold piece being capable of being driven in a closing and opening motion in a proper direction roughly perpendicular to the molding surface of said mold piece and at least one of said mold pieces including at least one molding element projecting on the molding surface of said mold piece, said molding element containing at least one opening for molding at least one connecting element, the process of the invention comprising the following steps:

the molding element is made in at least two separate parts, one part forming the support of said element and at least one other part forming a key of the same element;

the part forming the support of the molding element on a piece of the tire casting mold is positioned and fastened so that said support projects on the molding surface of said mold piece;

the molding element is constituted in the molding configuration by assembling each key with the support of said element;

the mold is closed by moving each mold piece in its closing direction;

the rubber tread is then molded (in order to obtain a shape reproducing the shape of the mold);

each key is disengaged from the support of the molding element to permit stripping of the molding element;

the support of the molding element is taken out of the molded tread by moving each mold piece in its proper opening direction opposite the closing direction.

A preferred method for disassembling the keys consists of providing means so that each key can be moved in relation to the support with which it is assembled in a direction different from the closing/opening direction of the mold piece bearing said element; in practice, the keys can be moved in a direction which is generally perpendicular to said closing/opening direction.

A possible variant of the process described above consists of reversing the order of steps three and four, that is, closing the mold before constituting each molding element in its molding configuration by assembly of each key with the support of each element.

According to another aspect of the invention, a molding element is proposed, which is intended to be mounted on a mold piece for molding a part of a tire tread and to project on a molding surface of said piece, the molding element being designed to mold a groove in said tread, two of the main walls of said groove being provided with at least one connecting element joining said walls when new.

Said molding element presents a longitudinal direction (roughly the direction joining the most distant anchoring points of said element on the mold) as well as a transverse direction (generally perpendicular to the longitudinal direction) and an average thickness in the third direction perpendicular to the two preceding ones. Said molding element contains in molding configuration at least one opening crossing said molding element on both sides along its thickness in order to let the material constituting the tread pass during molding and thus mold at least one connecting element joining the main walls of the groove.

The molding element according to the invention consists of a first part and a second part. The first part constitutes the support of the molding element intended to be fastened on a piece of a casting mold of a rubber tread by appropriate means in order to project on the molding surface of said mold piece and to follow said piece in its opening and closing motions. The second part of the molding element contains one or more pieces, each forming a key intended to be assembled with the first part of the molding element, so as to form openings for molding connecting elements joining the main walls of the groove. The molding element is characterized in that each key of said element is removable from the support of said molding element in order to make stripping possible, after molding of the groove, without rupture of the connecting elements molded.

"Removable" is understood to mean essentially that each key, partially defining at least one opening in the molding element, can be disengaged from the support of said element after molding of a tread, so that each key cannot stand in the way of stripping of the support of the element in the opening motion of the mold.

According to one particular embodiment of the invention, the molding element of the invention is characterized in that:

- at least one molding element opening, seen along a longitudinal section of said element, is totally closed by at least two separate parts of said element;
- at least one key of the molding element partially defines said opening, so as to mold a wall of the connecting element molded in said opening;
- each key can be set in place and disengaged (or even removed) from its support by moving it in a direction different from the direction of opening of the mold piece bearing the support of the molding element.

An opening totally closed by separate parts is understood to mean an opening which, when the molding element provided with said opening is seen in longitudinal section (that is, in a plane including the longitudinal direction of the element and generally tangent to the faces of said element molding the main walls of the groove), is almost entirely delimited, that is, with little play or clearance between the removable parts and the parts forming a support, in its cross section, by mold pieces and the molding element or solely by parts of the molding element.

With the molding element according to the invention, it can easily be seen that the movement of disengagement of each key from its support makes possible the movement of stripping of the mold piece bearing the support of said molding element, without any connecting element formed standing in the way and being broken by said molding element during that stripping movement. The movement of disengagement of each key is carried out along a path contained generally in a surface corresponding to the middle surface of the molding element (said surface being defined as the surface passing midway from the walls of the element molding the main walls of the groove) and in a direction which, for example, can be generally perpendicular to the direction of stripping of the mold piece bearing said element.

The molding element according to the invention offers the possibility of making a plurality of connecting elements in the same groove, at least two of said elements being placed, in the direction of depth of the groove, above one another (as shown, for example, in FIG. 1).

The molding element according to the invention can be used in a tire mold as well as in a mold for casting a flat tread or closed ring-shaped tread, said tread being intended to be placed subsequently on a tire in the course of manufacture or retreading.

Another application of such a tread can be the manufacture of a nonpneumatic rolling assembly having a rolling surface (such as, for example, a track for a tracked vehicle).

Other possibilities and advantages of the molding element according to the invention will be apparent from the description which follows and the accompanying drawings which present in nonlimitative fashion working variants of the present invention.

DESCRIPTION OF PREFERRED EMBODIMENTS

FIG. 1 represents a slit 1 of narrow width h, compared to the thickness of the tread-being defined by two flat main walls 4, 5 of two rubber blocks 2, 3 situated opposite each other.

The two main walls 4, 5 of the slit 1 are joined by four rubber connecting elements 6, 7, 8, 9 whose intersections with the walls 4, 5 have approximately rectangular shapes and are situated at the vertices of an approximately square shape.

Figure 2:
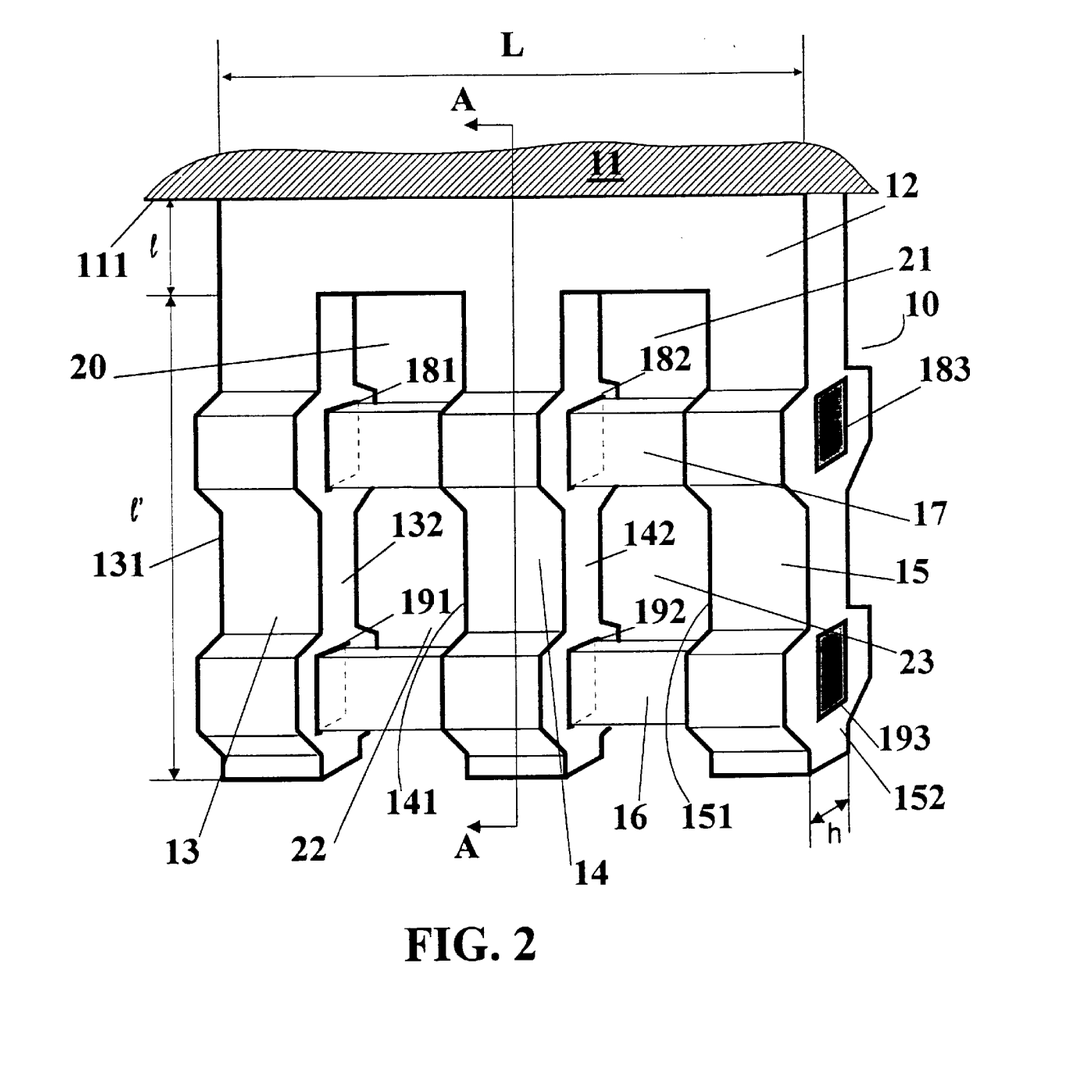
FIG. 2 represents a molding element according to the invention, containing four openings for molding four connecting elements arranged in a manner similar to the arrangement of the connecting elements of the slit shown in FIG. 1.

FIG. 2 shows a molding element 10, projecting from the molding surface 111 of a piece of a vulcanization mold 11 of a tire tread. The molding element 10 is represented in its molding configuration and consists of two parts assembled together to permit the molding in a rubber tread of a groove pattern provided with four connecting elements arranged in a manner similar to the connecting elements of the slit represented in FIG. 1.

A generally flat first part forms the support 12 of the element 10 and is fastened to the mold 11 by appropriate means for projecting from the molding surface 111 of said mold; in said FIG. 2, only the part of the support projecting on the surface 111 is visible. In the example presented, the support 12 is roughly perpendicular to the molding surface 111; it is, of course, possible to incline it by an angle different from 90° in relation to the molding surface 111, so as to mold a slit not perpendicular to the rolling surface of the tread.

The part of the support 12 projecting from the molding surface 111 is composed of a rectangular part of length L, width l and thickness h extended in the transverse direction of the support by three branches 13, 14, 15 of about the same total length l' and same width d, said branches being evenly spaced in the longitudinal direction of the support. These branches 13, 14, 15 are arranged so as to mold the innermost points of the groove in the direction of thickness of the tread relative to its rolling surface. The maximum depth H of the groove molded with that molding element corresponds to the sum of l and l'.

Each branch 13, 14, 15 is provided with a front face and a back face generally parallel to each other, said faces being intended to mold main walls of a groove, and side walls 131, 132, 141, 142, 151, 152 generally perpendicular to said front and back faces. Each branch contains, in proximity to its end corresponding to the points of the molding element farthest from the molding surface of the mold bearing said element and at an intermediate distance, a slight bulge forming extra thickness; each of said bulges is provided with a hole constituting a passage 181, 182, 183, 191, 192, 193, of approximately rectangular section in the example presented, each of the passages crossing a branch in its entire length in order to connect its side faces.

The second part of the molding element consists of two keys 16, 17 shown in the form of bars of rectangular cross section and of length about equal to the length L of the support 12. Said keys 16, 17 are arranged to be inserted in the branches 13, 14, 15 of the support 12 by insertion in the passages 181, 182, 183, 191, 192, 193 so as to constitute the molding element in its molding configuration.

Figure 3:
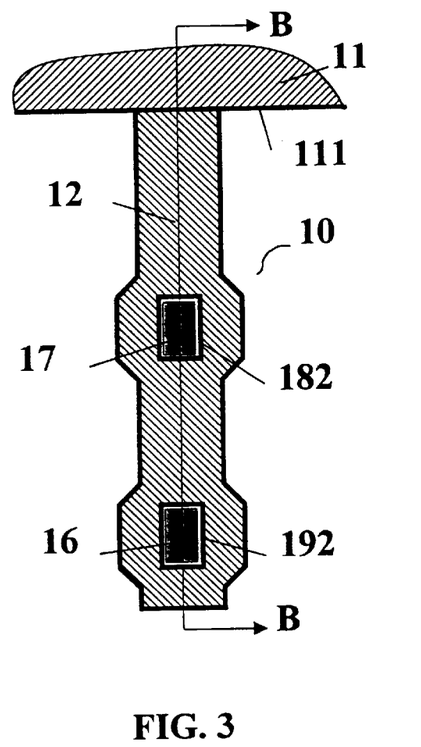
FIG. 3 shows a section along A—A of the molding element of FIG. 2.

A cross section of the molding element formed is represented in FIG. 3 along a line A—A visible in FIG. 2. Each rectangular passage 182, 192 has suitable dimensions for sliding in the keys 16, 17 with a reduced but still sufficient clearance. The clearance provided is limited in order to reduce penetration of the rubber in the passages as much as possible during molding of the tread. The passages 181, 182, 183 made toward the middle of the length of the branches 13, 14, 15 of the support 12 (like those situated near the ends) are arranged so that the same key 17 can be introduced simultaneously in the said three passages, so as to define with the support 12 of the molding element 10 two openings 20, 21 intended to mold two connecting elements of rectangular cross section. Finally, after placement of the second key 16 in the passages provided 191, 192, 193, two other openings 22, 23 are formed and defined by the branches of the support 12, by key 17 and by key 16.

During the molding of a groove in a rubber tread by the molding element 10, the rubber is molded against the walls of said element and fills the openings 20, 21, 22, 23 thus joining the opposite walls of the groove.

Figure 4:
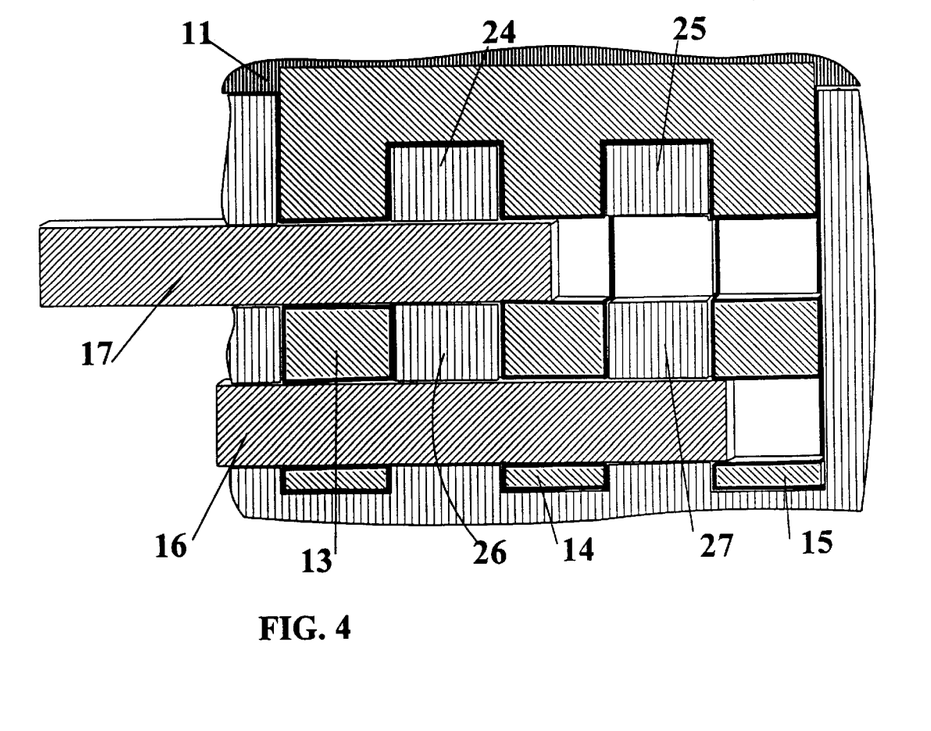
FIG. 4 shows a section along B—B of the molding element of FIG. 2, in which the keys are partially disengaged from the support after molding of a rubber tread.

After molding of a groove by the molding element 10 in its molding configuration of FIG. 2 and before stripping the molding element 10, the keys 16, 17 are disengaged from the support by sliding out of their respective passage; this movement of disengagement of each key takes place in a direction which is essentially different form the direction of stripping of the mold piece bearing the molding element. FIG. 4 shows an intermediate stage of said movement of disengagement in the course of fabrication. In order to carry out that movement of disengagement of the keys, means, not shown in FIG. 4, are provided.

In FIG. 4, the molding element 10 is shown along a section B—B marked in FIG. 3, said element being shown within in the rubber after molding of a tread and before the phase of stripping said element from the mold. Beside the formation of four connecting elements 24, 25, 26, 27, the keys 16, 17 can be distinguished, being partially disengaged from the branches 13, 14, 15 of the support 12. Continuing disengagement of the keys 16, 17 to completion, the rubber connecting elements formed are no longer in contact with said keys and stripping of the molding element is then possible in the usual manner by displacement of the different mold pieces. In the example presented, the keys 16, 17 are displaced in a direction parallel to the longitudinal direction of the molding element 10, while the direction of displacement of the support 12 is perpendicular to that direction.

The molding element just described can be advantageously modified so as to obtain one or more openings, whose cross sections have varied shapes, in order to mold connecting elements suited to the performance requirements sought for a tread provided with a plurality of slits and/or grooves of that type. Of course, the shapes of the supports and keys can also be adjusted so as to mold a particular groove shape (the branches of the support can, for example, be of different width and/or length and/or thickness; the keys can, for example, be of circular or even oval cross section).

Figure 5:
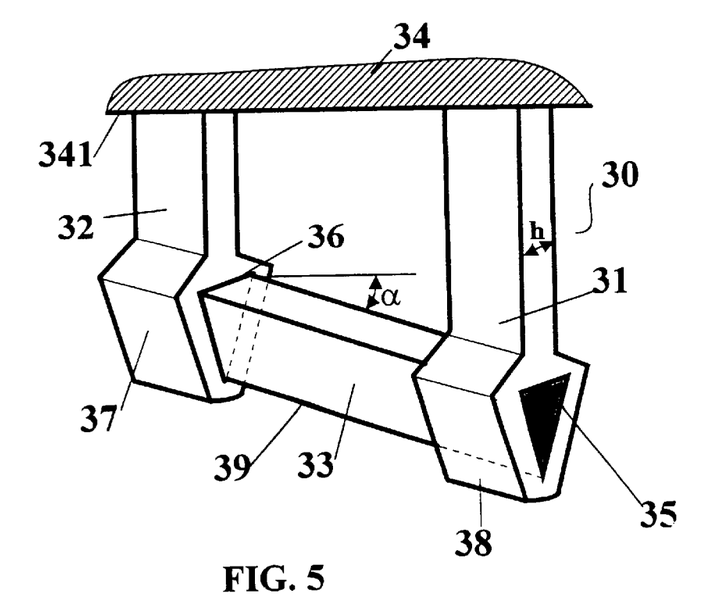
FIG. 5 represents another variant of a molding element, the support of which contains two separate parts projecting on the surface of the mold.

FIG. 5 shows a variant of a molding element 30 according to the invention, containing a support consisting of two separate parts 31, 32 of different heights and projecting from a piece 34 of the molding surface 341. Each of the two parts 31 and 32 of the support, of rectangular shape and thickness h, contains at its end farthest from the molding surface 341 of the mold an enlargement 37, 38 of triangular external shape, with a hole forming two passages 35, 36 of triangular cross section, said passages 35, 36 being intended for placement of a key 33 of triangular cross section corresponding to the cross sections of the passages 35, 36 with sufficient clearance for placement of a key.

The key 33 of triangular cross section is preferably so oriented that the lower edge 39 of the key, once in place, comes in contact with the rubber to be molded, thereby reducing the force necessary for penetration of the molding element in said mixture. Furthermore, taking into account the difference of height between the two parts 31 and 32 of the support, the upper face of the key 33 forms an angle α with a direction tangent to the surface of the piece of the mold where the molding element 30 is fastened.

As a variant to the latter element, it can be arranged for one of the passages 35 or 36 to extend only on one side of parts 31 or 32 and to be of suitable size for receiving the end of the key 33 this arrangement reduces the quantity of rubber which can enter said passage.

In this variant of a molding element 30 according to the invention, a slit is obtained after molding that opens on the rolling surface of the tread, whose main walls are mechanically joined by a rubber bridge level with said rolling surface. It is thus possible to obtain a new tread having a large number of grooves, while maintaining maximum stiffness and having a length of active edges appreciably increased after partial wear reaching the molded part through the key 33.

In use, it was found that the clearance necessary for placement of the keys in the passages by simple sliding led to the creation of rubber films (film being understood to mean a quantity of rubber of slight thickness, that is, equal at most to the play between key and passage). Such rubber films are broken at least locally at the time of disengagement of the keys and during final stripping of the molding element, so that the continuity of the groove molded is not affected. In order to further reduce the presence of those films after stripping, it is advantageous to provide in each key passage and on each key a threading making it possible to insert each of said keys by screwing in order to assemble the molding element. This arrangement makes it possible to reduce appreciably the quantity of rubber capable of entering each passage and thus facilitates the disengagement of each key by reducing the force to be applied on each key. Furthermore, the rotary motion required on each key for unscrewing has the effect of shearing and, therefore, of breaking the possible films formed between each key and the key passages.

In order to further facilitate the disengagement of each key from the support, it is advantageous to arrange for each of said keys to be truncated cone-shaped (cross section whose surface progressively diminishes from one end of said key to the other), the passages also having truncated cone shapes; in addition, this arrangement can be combined with the presence on each key, at least in the zones corresponding to each passage, of threads making possible the placement of said keys in the passages by screwing, in order to break systematically the rubber films formed during molding in each passage.

Figure 6:
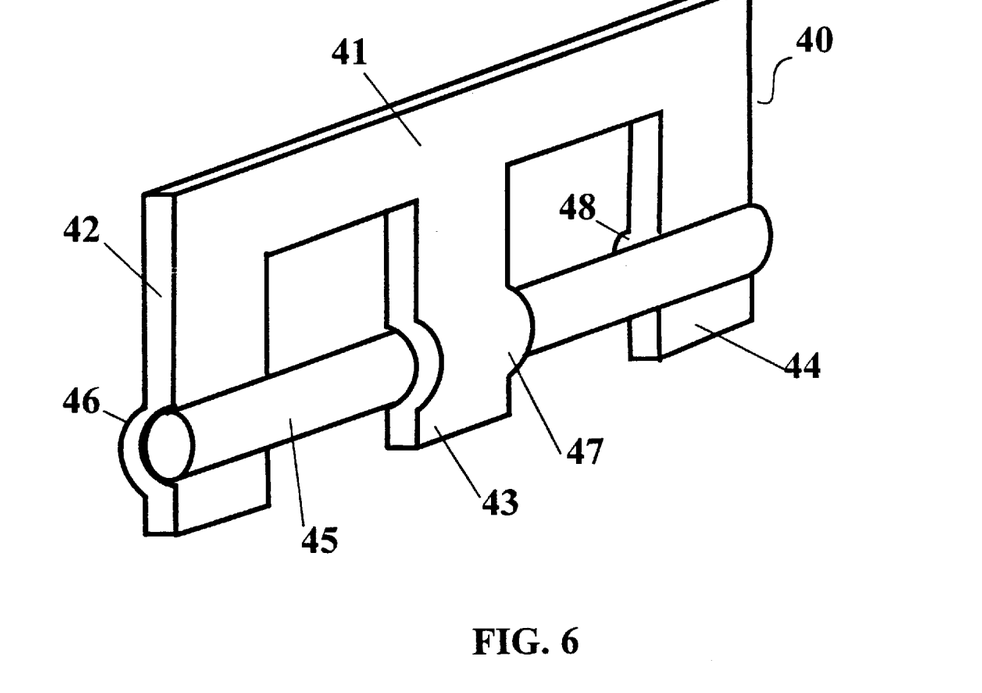
FIG. 6 shows another variant of a molding element in which the branches of the support have appropriate geometries to permit passage and holding of the keys in place for the molding of a rubber tread.

FIG. 6 shows another variant of a molding element 40 according to the invention, containing a first flat part 41 extended by three branches 42, 43, 44 of generally the same height and same thickness as the flat part 41. Each branch 42, 43, 44 contains a semicylindrical deformation 46, 47, 48 situated in proximity to the ends of each of said branches. Said deformations 46, 47, 48 are alternately oriented, that is, one branch and the one directly following (in the longitudinal direction of the element) present deformations whose concavities are oriented in opposite directions; in that way, three passages are made, each of them not being completely closed, in which it is possible to insert, before molding, a key 45 of appropriate circular section, said key 45 being held in place by the alternation of concavities of the deformations 46, 47, 48 and possibly the elasticity of the branches 42, 43, 44 during the phase of penetration of the rubber mixture. The semicylindrical geometry of the deformations is, of course, not a necessity, any other geometric shape adapted to the shape of the keys also being suitable.

In another variant close to that represented in FIG. 6, it can be arranged for at least one deformation (though not totally closed, reflecting what is shown in FIGS. 3 and 5) to be capable of withstanding the forces exerted on the rubber during the molding operation in order to hold a key in place.

Figure 7:
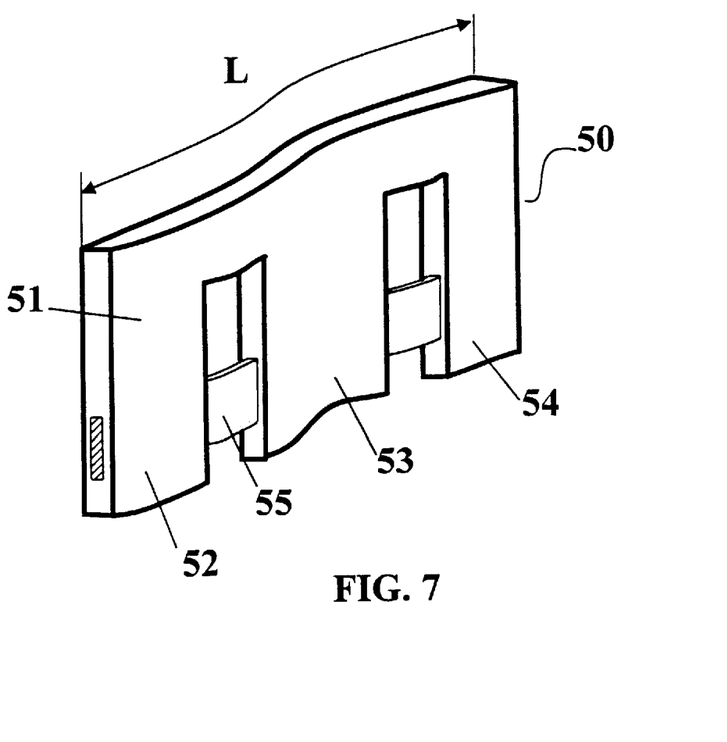
FIG. 7 shows a variant of a molding element having a wavy shape in the length of said element.

FIG. 7 shows another variant of a molding element 50 according to the invention, making it possible to mold a slit of slight average thickness before the thickness of the molded tread and whose outline on a new tread surface and on every surface parallel to the surface of said new tread, taken in the thickness of said tread, is wavy, said slit being provided with rubber connecting elements ensuring a mechanical bond between the main walls of said slit. The molding element making it possible to mold that slit contains a support 51 including three branches 52, 53, 54, said support being formed in a metal plate of constant thickness and presenting corrugations in the longitudinal direction of the support. A passage is made in each of the branches 52, 53, 54, so as to be able to set a key 55 in place, said key following to the extent possible the corrugations of the support 51.

For that purpose, it is arranged to use a sufficiently flexible material of slight thickness to fabricate the key 55, so as to be able to engage said key in the passages provided on the support and to remove it from said passage in order to make it possible, after molding of a slit, to strip the molding element. One working example consists of fabricating the key 55 in the form of a thin metal strip of thickness less than that of the branches 52, 53, 54 of the support and of placing it edgewise so as to be able to deform it easily for placement in the passages provided in the branches 52, 53, 54. In this arrangement, the key 55 sufficiently withstands the forces exerted by the rubber during the phase of penetration of the molding element in the tread rubber.

Another working example consists of using a flexible cord to form the key 55; cord is understood to mean a single wire or an assembly of several wires.

One practical embodiment making possible placement in the support and disengagement of the keys after molding of a tread consists, for example, of providing on the mold and on both sides of the molding element ribs on which said element bears and inside which housings of adequate dimensions are further provided, making it possible to seat said keys by appropriate means.

Figure 8:
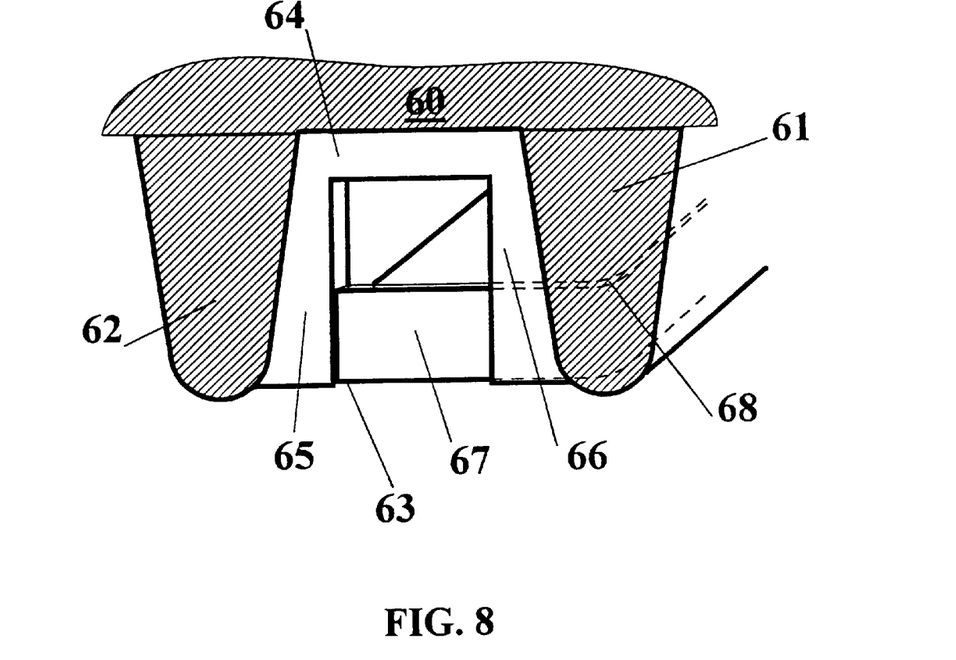
FIG. 8 shows a variant of a molding element mounted between two ribs projecting on the molding surface of a mold and making possible the disengagement of a key inside a rib.

FIG. 8 shows an application, according to another variant, making possible the placement of a key in a support and its disengagement. In FIG. 8, a mold part 60 can be seen, containing two ribs 61, 62 intended to mold two grooves in a tire tread and, placed between said two ribs 61, 62, a molding element 63 according to the invention and having a support 64 bearing both on the molding surface of the mold 60 and on the two ribs 61, 62. The support 64 is provided with two branches 65, 66 set up to bear on the ribs 61, 62, and said branches contain passages arranged near their ends. With that support 64, a key 67 is assembled to make the molding element 63. The peculiarity of that molding element variant, represented in FIG. 8, is that it is provided, in the extension of the passage made on the branch 66, with a housing 68 (represented in dotted lines) in the rib 61 adjacent to the molding element 63, said housing 68 being functionally arranged to make possible the disengagement of the key 67 inside the rib 61 by following a rotary motion on an axis roughly perpendicular to the surface of the mold. Means not represented are also provided to carry out the movement of placement and disengagement of the key 67.

Figure 9:
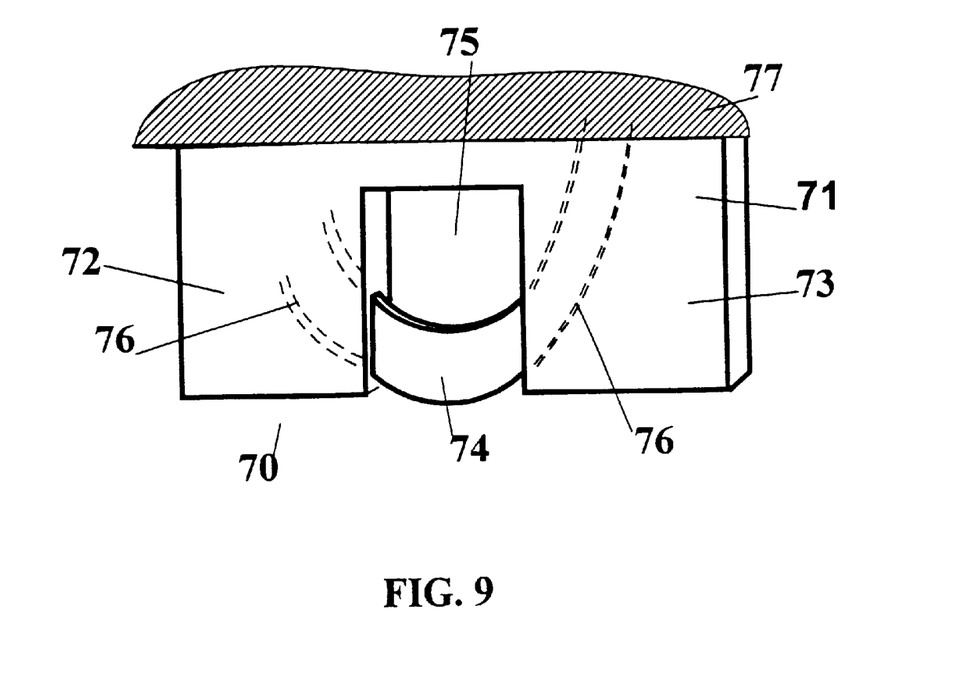
FIG. 9 shows a variant of a molding element according to the invention, in which the movement of disengagement of a key is carried out inside the support and extends into the mold.

It is advantageously also possible to carry out the disengagement of each key inside even a part forming the support of a molding element according to the invention. One example of such an application is represented in FIG. 9, which shows a molding element 70 in its molding configuration formed by a support 71 containing two branches 72, 73 and by a key 74, one part of which is visible between the two branches 72, 73 in order to form an opening 75. In FIG. 9, a housing 76 is represented in dotted lines inside the branches of the support 71, said housing 76 being extended up to the mold 77, in order to make it possible to receive the key 74 totally at the time of the disassembly operation. In the variant presented in FIG. 9, the movement of the key 74 inside its housing 76 follows a roughly circular path on an axis of rotation perpendicular to a plane containing the longitudinal and transverse direction of the molding element. Means, not represented here, are further provided in order to be able to activate the key 74 and thus place it in the support 71 to form the molding element 70 before molding as well as to displace it to make stripping from the mold possible.

Another variant of the latter molding element placed between two mold ribs consists of making a support consisting solely of a branch bearing on said ribs, said branch containing at least one passage for a key, said key, once in place for molding, joining the branch to the second of said ribs set up to receive the end of said key.

In general, the molding element according to the invention can be used in a rubber tread molding and vulcanization mold alone as well as in a mold of a tire provided with a tread.

One advantage of the molding element according to the invention resides in the ease with which it is possible to change one or more keys of said element, for example, after intense use necessitating a replacement without having to change said element in its entirety.

Of course, all of the examples of molding elements of the invention, which have been described, can be arranged to have a zigzag or wavy general shape in the direction of their height, that is, according to the thickness of the molded tread.

I claim:

1. A process for molding of a rubber tread provided with at least one groove, whose main walls contain at least one connecting element, said process using a mold containing several mold pieces, each mold piece being capable of being driven in a closing and opening motion in a direction generally perpendicular to the molding surface of said mold piece and at least one of said mold pieces including at least one molding element projecting from the molding surface of said mold piece, said molding element containing at least one opening for molding at least one connecting element, the process comprising the following steps:

making the molding element in at least two separate parts, one part forming a support for the element and at least one other part forming a key of the element;

maintaining the part forming the support of the molding element on a piece of the tire casting mold so that said support projects from the molding surface of said mold piece;

constituting the molding element in the molding configuration by assembling each key with the support of said element;

closing the mold by moving each mold piece in its closing direction;

molding the rubber tread;

disengaging each key from the support of the molding element;

extracting the support by moving each mold piece in its opening direction opposite the closing direction.

2. A process according to claim 1, in which each key, in order to be disengaged from the support of the molding element, is moved in a direction different from the closing/opening direction of the mold piece bearing said element.

3. A molding element of a mold for molding a groove pattern in a rubber tread, said groove being defined by at least two main opposite walls joined by at least one rubber connecting element, said molding element having at least one opening for molding each of said connecting elements during molding of the tread, the molding element comprising an assembly of a first part forming a support of the element intended to project from a molding surface of a piece of the mold and of a second part constituted by one or more pieces, each forming a key, the molding element being characterized in that each key is removable from the support of the element in order to permit stripping of the mold.

4. A molding element according to claim 3, in which each key at least partially defines an opening through the molding element and each key can be moved in a direction appreciably different from the closing/opening direction of the mold piece bearing said element in order to permit the stripping of said element without rupture of the connecting elements formed in the groove.

5. A molding element according to claim 4, in which each key can be moved in a direction generally perpendicular to the direction of closing/opening of the mold piece bearing said element in order to permit stripping said element without rupture of the connecting elements formed in the groove.

6. A molding element according to claim 4, characterized in that the support is provided with at least one passage for placement of a key in order to constitute said molding element before molding.

7. A molding element according to claim 6, in which at least one passage is provided with a threading to permit the mounting of a key by screwing into said passage, thus reducing the quantity of rubber molded in the passage.

8. A molding element according to claim 3, in which the support of said element includes of at least two separate parts, each part being fastened to a mold piece.

9. A molding element according to claim 3, in which said at least one key has a cross section which varies from one end of said key to the other in order to facilitate the operation of disengagement of said key from the support.

10. A molding element according to claim 3, in which said at least one key forms an angle α different from zero with a direction tangent to the molding surface of the mold.

11. A molding element according to claim 3, in which the groove outline on the tread surface molded by said element has a wavy shape and each key is made with sufficient flexibility to be set in place on the support before molding and to be removed in order to strip said molding element.

12. A molding element according to one claim 3, in which the support contains at least two branches, each having at least one deformation presenting a concavity, said deformations having their concavities alternately oriented to permit the placement and holding of at least one key for forming said molding element.

13. A molding element according to claim 3, in which the movement of placement and disengagement of at least one key is carried out by following a generally circular path.

14. A molding element according to claim 3, including at least one relief element projecting, from the molding surface of the mold and in which means are provided for seating at least one key within the relief element.

15. A molding element according to claim 3, in which a housing is provided inside the support in order to receive a key at least partially during the movement of disengagement of said key.

16. A molding element according to claim 3, in which said at least one key is a cord.

17. A mold for a tire tread provided with at least one molding element as set forth in claim 3.

18. A molding element for a mold depending from the mold to form a groove defined by a pair of walls and a connecting element molded across the pair of walls, said molding element comprising a support including a plurality of parallel members depending from the mold, keyways formed in the depending members and at least one slidable key extending across the depending members and accommodated in the keyways, the depending members and at least one key defining in molding position openings across the molding element to mold the connecting elements between opposite walls of the grooves, the keys being slidably removable from the keyways to permit withdrawal of the depending members out of the grooves and away from molding position after molding without interference by the molded connecting elements.

19. A process for molding a groove defined by a pair of walls and a connecting element across the pair of walls using a molding element comprising a support including a plurality of parallel members depending from the mold, keyways formed in the depending members and at least one slidable key extending across the depending members and accommodated in the keyways, the depending members and said at least one slidable key defining in molding position openings across the molding element to mold the connecting elements between opposite walls of the grooves, the keys being slidably removable from the keyways to permit withdrawal of the depending members out of the grooves and away from the molding position after molding without interference by the molded connecting members, the process comprising moving the molding element into molding position, flowing the molding material through passages defined by the at least one key and depending members to form the connecting elements, slidably removing the at least one key from the keyways and moving the molding element away from the molding position.

\* \* \* \* \*